United States Patent
Yano et al.

(10) Patent No.: US 8,340,355 B2
(45) Date of Patent: Dec. 25, 2012

(54) THREE-DIMENSIONAL MEASUREMENT INSTRUMENT, IMAGE PICK-UP APPARATUS AND ADJUSTING METHOD FOR SUCH AN IMAGE PICKUP APPARATUS

(75) Inventors: Hiroshi Yano, Toyonaka (JP); Shiro Fujieda, Kyoto (JP); Yasuyuki Ikeda, Ikeda (JP)

(73) Assignee: Omron Corporation, Kyoto (JP)

(*) Notice: Subject to any disclaimer, the term of this patent is extended or adjusted under 35 U.S.C. 154(b) by 1116 days.

(21) Appl. No.: 12/234,187

(22) Filed: Sep. 19, 2008

(65) Prior Publication Data
US 2009/0087031 A1    Apr. 2, 2009

(30) Foreign Application Priority Data
Sep. 28, 2007 (JP) ................ P2007-254853

(51) Int. Cl.
*G06K 9/00* (2006.01)
(52) U.S. Cl. .............. 382/106; 382/154; 702/155
(58) Field of Classification Search .......... None
See application file for complete search history.

(56) References Cited

U.S. PATENT DOCUMENTS

| | | | |
|---|---|---|---|
| 4,825,091 A | 4/1989 | Breyer et al. | |
| 5,285,397 A | 2/1994 | Heier et al. | |
| 5,576,781 A * | 11/1996 | Deleeuw | 396/6 |
| 5,638,461 A * | 6/1997 | Fridge | 382/141 |
| 5,666,569 A * | 9/1997 | Fullam et al. | 396/101 |
| 2007/0104361 A1* | 5/2007 | Alexander | 382/154 |
| 2008/0072444 A1* | 3/2008 | Harrill et al. | 33/600 |
| 2008/0101688 A1* | 5/2008 | Quadling et al. | 382/154 |

FOREIGN PATENT DOCUMENTS

| | | |
|---|---|---|
| DE | 1 812 097 | 5/1960 |
| DE | 3600643 A1 | 7/1987 |
| DE | 3703422 A1 | 8/1988 |
| DE | 3941144 A1 | 6/1991 |

(Continued)

OTHER PUBLICATIONS

Zhengyou Zhang, "Camera Calibration with One-Dimensional Objects", Jul. 2004, IEEE Transactions on Pattern Analysis and Machine Intelligence, vol. 26, No. 7, pp. 892-899.*

(Continued)

*Primary Examiner* — Andrew W Johns
*Assistant Examiner* — Siamak Harandi
(74) *Attorney, Agent, or Firm* — Foley & Lardner LLP

(57) ABSTRACT

An image pickup apparatus is provided with cameras and string-shaped members. The user is allowed to know working distances based upon the lengths of the string-shaped members. The optical axis direction of the camera is adjusted so that the leading edge of the string-shaped member is included in the viewing field of the camera, and the optical axis direction of the camera is adjusted so that the leading edge of the string-shaped member is included in the viewing field of the camera. Even in the case when no image-pickup object is present, by presuming the position of the image-pickup portion of the object, the working distance from the presumed position can be found by the string-shaped member. Moreover, since the string-shaped members are coupled to each other at the image-pickup position, the directions of the optical axes of the cameras can be determined based upon the extending directions of the string members.

5 Claims, 11 Drawing Sheets

FOREIGN PATENT DOCUMENTS

| | | |
|---|---|---|
| JP | 03-148776 | 6/1991 |
| JP | 05-073502 | 10/1993 |
| JP | 07-333705 | 12/1995 |
| JP | 09-210677 | 8/1997 |
| JP | 10-206101 | 8/1998 |
| JP | 2004-013004 | 1/2004 |
| JP | 2005-114703 | 4/2005 |
| JP | 2006-250889 | 9/2006 |
| WO | WO 96/08791 | 3/1996 |

OTHER PUBLICATIONS

German Patent and Trademark Office examination report on application No. 10 2008 042 333.5 dated Sep. 30, 2010; 4 pages.

* cited by examiner

THREE-DIMENSIONAL MEASUREMENT INSTRUMENT, IMAGE PICK-UP APPARATUS AND ADJUSTING METHOD FOR SUCH AN IMAGE PICKUP APPARATUS

This application claims priority from Japanese Patent Application P2007-254853, filed on Sep. 28, 2007. The entire content of the aforementioned application is incorporated herein by reference.

BACKGROUND OF THE INVENTION

1. Field of the Invention

The present invention relates to a three-dimensional measuring instrument, an image pickup apparatus and a method for adjusting the image pickup apparatus, and more specifically concerns a technique that is used for an image pickup apparatus including a plurality of cameras and a three-dimensional measuring instrument so as to adjust the positions of the cameras and the optical axis directions thereof.

2. Description of the Related Art

Conventionally, a "stereo method", which obtains three-dimensional shape information and distance information to a measuring subject by using two picked-up images obtained by capturing images of the measuring subject from two mutually different positions, has been known. In this stereo method, by utilizing an image-formation positional deviation (parallax error) of a measuring subject occurring between two picked-up images, a depth distance is calculated based upon the principle of triangular survey.

For example, Japanese Patent Application Laid-Open No. 2006-250889 has disclosed a three-dimensional measuring system that adopts the stereo method. In this Patent Application, the three-dimensional measuring system including two cameras has been disclosed.

Image inspection systems utilizing the stereo method have been utilized in various fields. As a typical field of application of this image inspection system, a product inspection process in a production line of a factory is exemplified.

Most of the image inspection systems that have been conventionally introduced to production lines of factories have a small camera viewing field, with a short working distance (distance from the front face of a lens to a work). Consequently, upon introducing an image inspection system to a production line, the user can carry out adjustments in the positional relationship between the work and the camera viewing field or adjustments of the working distance comparatively easily.

In recent years, however, there have been strong demands for applications of an image inspection system to industrial products having a large size. In the case of large-size products requiring complicated assembling operations, there is a high possibility that operations to be carried out by the man and operations to be carried out by the machine are mixed in a production line. Therefore, upon installing a camera for use in an image inspection system in the production line, the camera needs to be set apart from the products so as not to intervene with the transferring processes and assembling processes of the product (that is, the work). For this reason, the working distance of the camera is inevitably made longer.

When the working distance of the camera is made longer, even a slight change in the light axis direction of the camera causes a large shift of the camera viewing field. Consequently, when the user adjusts the camera optical axis direction so as to capture an image of a predetermined inspection area on the work, the time required for the adjustments tends to become longer.

Moreover, in the above-mentioned three-dimensional measuring system, viewing fields of a plurality of cameras need to be superposed with one another. Consequently, in the case of the three-dimensional measuring system, the adjustments of the viewing fields of the cameras tend to become difficult as the working distance of the cameras becomes longer.

The present invention has been devised to solve the above-mentioned problems, and its objective is to provide easier adjustments of the positions and the viewing fields of the cameras in an image pickup apparatus provided with a plurality of cameras.

SUMMARY OF THE INVENTION

In short, the present invention relates to a three-dimensional measuring instrument that is provided with: a plurality of cameras; an attaching unit for attaching and securing the plurality of cameras; an adjusting mechanism used for adjusting an optical axis direction of each of the cameras; a plurality of string-shaped members that are installed on the corresponding cameras respectively, with first ends thereof being secured to the corresponding camera, so that information relating to a distance to a subject whose converged image is acquired by the camera is indicated by lengths thereof; and a processing unit that carries out a three-dimensional measuring process by using images of the common image-pickup subject that are captured by the cameras from different angles.

In the present invention, the expression, "a distance to a subject whose converged image is acquired by the camera", includes a state in which the distance between the camera and an image-pickup subject is set to such a distance range as to allow the camera to capture an image that is focused to such a degree that an image processing can be carried out thereon, and also includes a state between the camera and the image-pickup subject that provides the best focused image.

In the present invention, the expression, "information relating to the distance can be indicated by its length", includes a state in which, upon making the length of the string-shaped member coincident with the distance to a subject whose converged image is acquired by the camera, a mark is put at a position of the string-shaped member corresponding to the distance.

Preferably, the string-shaped members are tape measures that are attached to the corresponding cameras, and indicate distances from the corresponding cameras.

More preferably, the three-dimensional measuring instrument is further provided with a plurality of light-emitting devices. The light-emitting devices are installed in the corresponding cameras respectively, each of which is allowed to emit a light beam in the optical axis direction of the corresponding camera.

Another aspect of the present invention relates to an image pickup apparatus that is provided with: a camera used for capturing an image of a subject; an adjusting mechanism for adjusting an optical axis direction of the camera; an attaching unit that is installed in the camera or the adjusting mechanism so that the camera is attached thereto to be secured thereon; and a string-shaped member a first end of which is secured to the camera so that information relating to a distance to a subject whose converged image is acquired by the camera is indicated by a length thereof.

Preferably, the image pickup apparatus is further provided with: a light-emitting device that emits a light beam in an optical axis direction of the camera.

Still another aspect of the present invention relates to a method for adjusting an image pickup apparatus. The image pickup apparatus is provided with a plurality of cameras; and a plurality of string-shaped members that are installed on the corresponding cameras respectively, with first ends thereof being secured to the corresponding camera, so that information relating to a distance from the corresponding camera is indicated by lengths thereof. The adjusting method includes the steps of: with respect to the respective string-shaped members, coupling second ends to each other so that the second ends of the respective string-shaped members are coincident with each other at a distance from which the corresponding camera is indicated by the length of the string-shaped members; applying tensions to the respective string-shaped members so that the respective string-shaped members are linearly extended; placing an image-pickup subject at the position of the second ends that are coupled to each other, with the tensions being applied to the respective string-shaped members; and adjusting the optical axis direction of each of the cameras so as to pick up an image of the image-pickup subject placed at the position of the second ends that are coupled to each other.

Preferably, the image pickup apparatus is further provided with a plurality of light-emitting devices that emit light beams in optical axis directions of the corresponding cameras. The adjusting method is further provided with a step of generating a light beam from each of the light-emitting devices and a step of adjusting the optical axis direction so as to allow the light beam to reach an Still another aspect of the present invention relates to a method for adjusting an image pickup apparatus. The image pickup apparatus is provided with a plurality of cameras; and a plurality of string-shaped members that are installed on the corresponding cameras respectively, with a first end thereof being secured to the corresponding camera, so that information relating to a distance to a subject whose converged image is acquired by the camera is indicated by lengths thereof.

The adjusting method includes the steps of: placing an image-pickup subject at a predetermined position; securing the second ends of the respective string-shaped members to the image-pickup subject; applying tensions to the respective string-shaped members so that the respective string-shaped members are linearly extended; and determining positions of the respective lenses of the cameras relative to the predetermined position, based upon the lengths of the string-shaped members corresponding to the cameras.

Preferably, the adjusting method further includes the step of: adjusting the optical axis direction of each of the cameras based upon the extending direction of the corresponding string-member.

More preferably, the image pickup apparatus is further provided with a plurality of light-emitting devices that emit light beams in optical axis directions of the corresponding cameras. The adjusting method is further provided with a step of generating a light beam from each of the light-emitting devices and a step of adjusting the optical axis direction so as to allow the light beam to reach an image-pickup subject.

In accordance with the present invention, in an image pickup apparatus having a plurality of cameras and a three-dimensional measuring instrument, the adjustments of the cameras can be carried out easily.

DETAILED DESCRIPTION OF THE PREFERRED EMBODIMENTS

Figure 1:
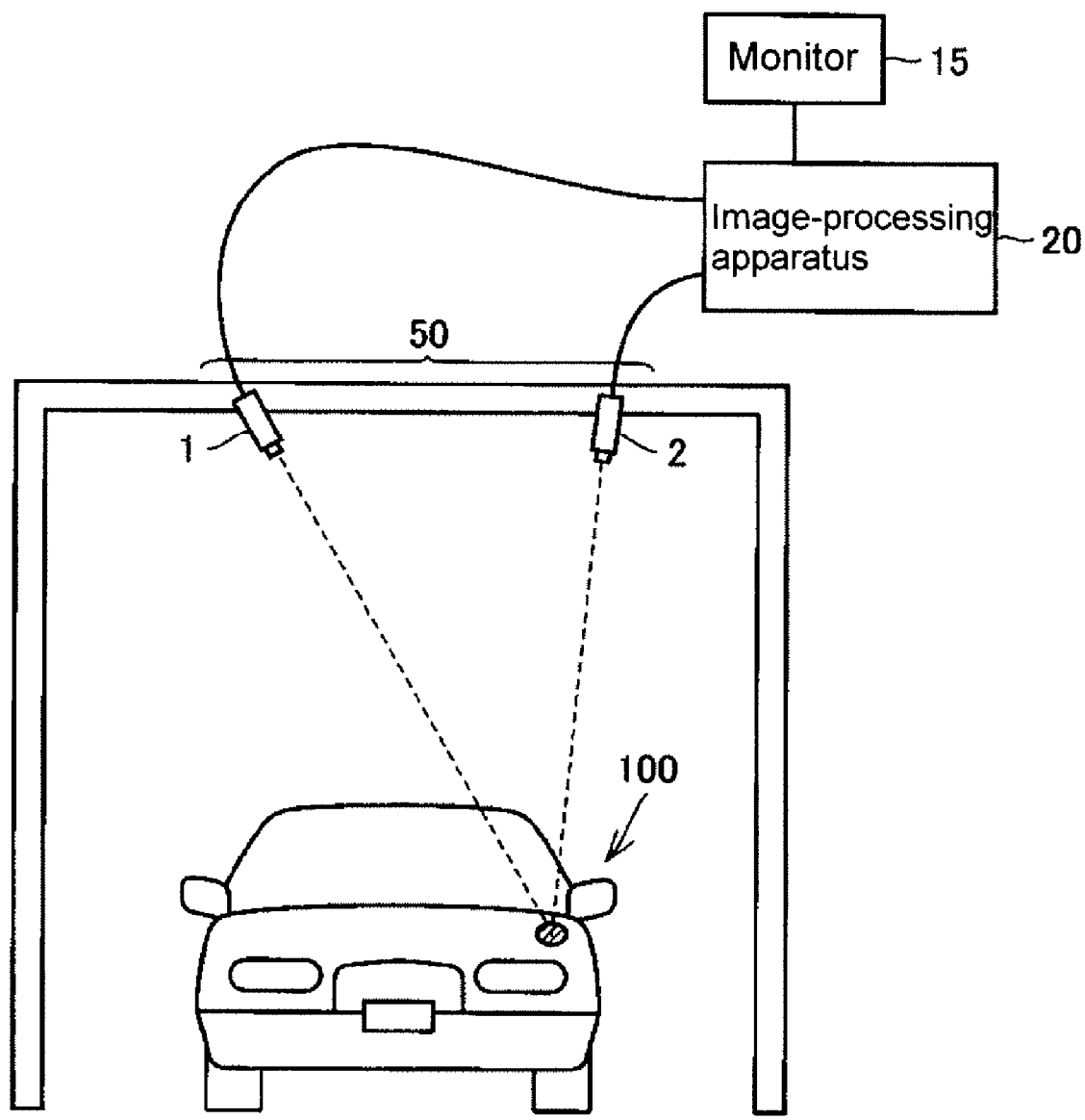
FIG. 1 shows a drawing that explains an image inspection system including an image pickup apparatus 50 in accordance with embodiment 1.

Referring to Figures, the following description will discuss embodiments of the present invention in detail. Here, in the Figures, those members that are the same or those corresponding members are indicated by the same reference numerals, and the description thereof will not be repeated.

[Embodiment 1]

FIG. 1 shows a drawing that explains an image inspection system including an image pickup apparatus 50 in accordance with embodiment 1. In the present embodiment, the image inspection system is prepared as a three-dimensional measuring instrument that adopts a stereo method. However, the usage of the image pickup apparatus 50 is not limited to the image inspection system.

As shown in FIG. 1, the image inspection system is provided with the image pickup apparatus 50, a monitor 15 used for displaying an image captured by the image pickup apparatus 50, and an image-processing apparatus 20 that executes predetermined processes based upon the image captured by the image pickup apparatus 50.

The image pickup apparatus 50 is provided with cameras 1 and 2 that are attached to two different positions, and capture images at predetermined areas in a work 100. Although the number of the cameras is two in the present embodiment, the number of cameras is not intended to be limited by two, as long as two or more cameras are used.

By using two images obtained by allowing the cameras 1 and 2 to capture images of inspection subject portions of the work 100, the image-processing apparatus 20 carries out a three-dimensional measuring process. The three-dimensional measuring process is carried out by using a generally known stereo image-processing. That is, the image-processing apparatus 20 obtains three-dimensional shape information of the corresponding portions or height information of the corresponding portions by the stereo method. Then, the image-processing apparatus 20 executes an inspection process based upon the information.

The work 100, shown in FIG. 1, is an automobile. In a production line for a product, such as an automobile, that has a large size and requires complicated assembling operations, those operations to be executed by the man and those operations to be executed by the machine are sometimes present in a mixed manner. In such a production line, the cameras have to be installed so as to prevent the cameras from intervening with the transportation of the product and the assembling operations thereof. For this reason, a working distance needs to be made longer.

Here, in general, the inspection system is introduced to a production line prior to a flow of products along the production line. That is, there is a high possibility that, upon installing the cameras 1 and 2, no products are present along the production line. The user (suppose that a worker for installing the cameras 1 and 2 is included) is required to know a working distance in order to install the cameras. In order to find the working distance, the locations of inspection subject portions of the work need to be specified. In this case, however, since no works 100 are present, no objects are actually present at positions corresponding to the inspection subject portions of the work 100. Consequently, it becomes difficult to specify the locations of the inspection subject portions of the work. In accordance with embodiment 1, it becomes possible to determine a working distance even in such a case.

Moreover, in the present embodiment, the center directions (hereinafter, referred to as "camera optical axis directions") of the viewing fields of the respective cameras have to be adjusted so that the viewing fields of the cameras 1 and 2 are mutually superposed on each other. Since the working distance is long (for example, 2 m), even a slight deviation in the optical axis direction of the camera causes a large shift of the viewing field of the camera. Moreover, the viewing field of each of the cameras 1 and 2 is comparatively small (for example, 5 cm in each of four sides) so as to ensure high precision of the image inspection. Furthermore, no works are present. Under these circumstances, it is generally considered that it is difficult to confirm whether the viewing fields of the cameras 1 and 2 are mutually superposed on each other or not. According to the embodiment 1, however, it is possible to confirm whether the viewing fields of the cameras 1 and 2 are mutually superposed on each other or not.

Figure 2:
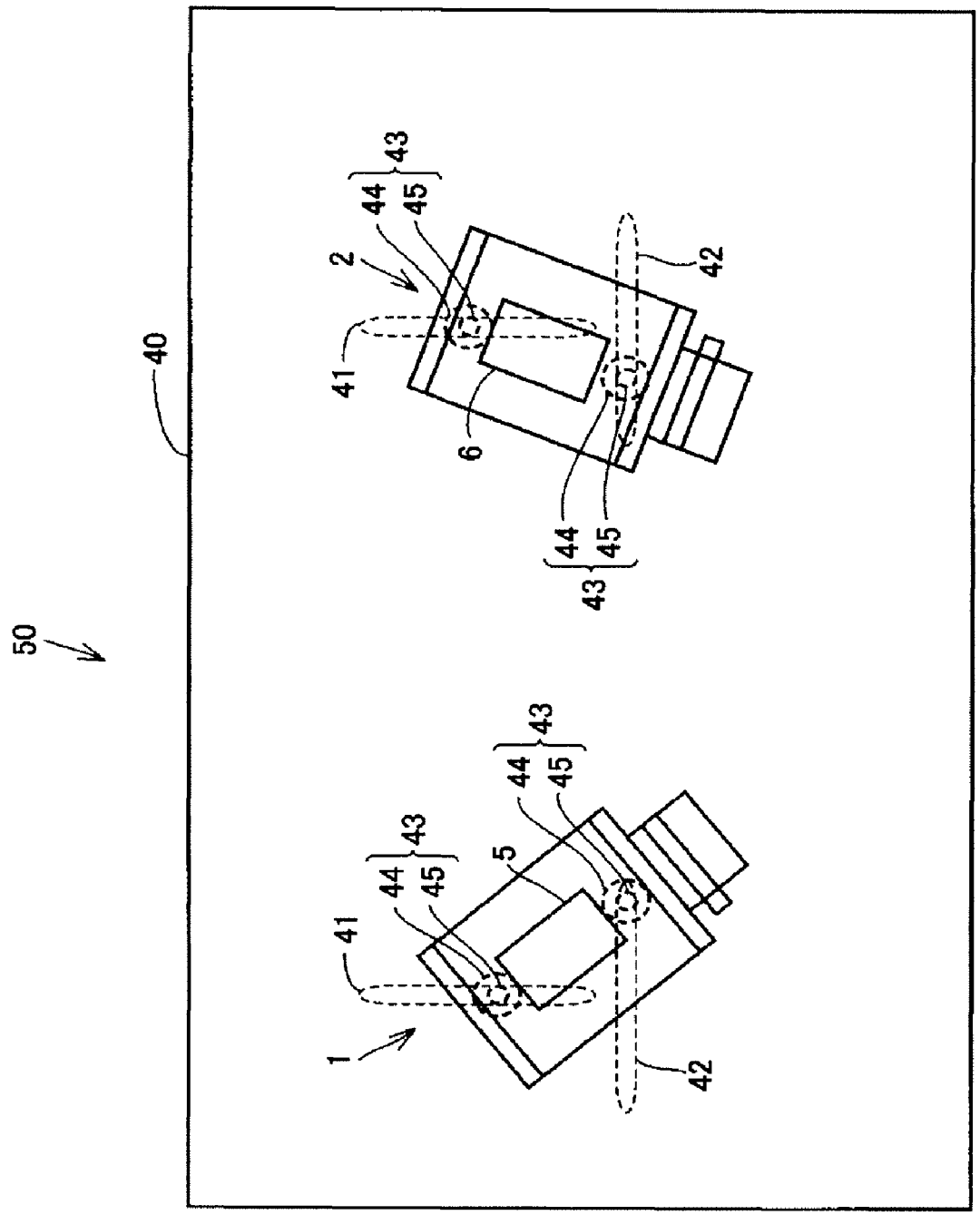
FIG. 2 shows a drawing that explains a structural example of an adjusting mechanism used for adjusting optical axes of respective cameras 1 and 2.

The optical-axis direction of each of the cameras 1 and 2 can be adjusted by an adjusting mechanism. FIG. 2 shows a drawing that explains a structural example of the adjusting mechanism used for adjusting the respective optical axes of the cameras 1 and 2.

As shown in FIG. 2, the image pickup apparatus 50 is provided with an adjusting mechanism 40. In the structure shown in FIG. 2, the adjusting mechanism 40 is a base plate having a plane. The cameras 1 and 2 are placed along the plane of the base plate.

In the adjusting mechanism 40, through holes 41 and 42 for use in positioning the cameras 1 and 2 are formed.

Two screw holes are formed on each of the cameras 1 and 2. Two screws 43 are used for the respective cameras so as to attach and secure the respective cameras 1 and 2. The following description will explain the installation of the camera 1: the two screws are placed so that the screw heads 44 thereof are positioned on the rear face (face on the side opposing to the installation face of the cameras 1 and 2) of the adjusting mechanism 40 (base plate). One of the screw portions 45 of the two screws 43 is inserted through the through hole 41, and threaded with one of the two screw holes of the camera 1. The other screw portion 45 of the two screws 43 is inserted through the through hole 42, and threaded with the other of the two screw holes of the camera 1. By rotating the screw heads 44, the user can attach the camera 1 to the adjusting mechanism 40. In the same manner, the camera 2 is also attached to the adjusting mechanism 40 by using the two screws 43. That is, the screw holes formed in the respective cameras 1 and 2 and the screws 43 correspond to "attaching units" of the present invention.

For example, by lightly tightening the screws 43, the user can rotate the respective cameras 1 and 2 on the plane of the adjusting mechanism 40 (base plate). Thus, it becomes possible to adjust the optical axis direction of each of the cameras 1 and 2. When the optical axis direction of each of the cameras 1 and 2 has been determined, the optical axis direction of each of the cameras 1 and 2 can be fixed by firmly tightening the screws 43.

In the arrangement shown in FIG. 2, the cameras 1 and 2 are directly attached to the adjusting mechanism 40. However, the attaching method for the cameras 1 and 2 is not intended to be limited by the method shown in FIG. 2. For example, each of the cameras 1 and 2 may be attached to the adjusting mechanism 40 with an L-letter-shaped angle bar being interposed therebetween. In this case, one of the two faces orthogonal to each other of the L-letter-shaped angle bar is made in contact with the plane of the adjusting mechanism 40 (base plate), with the other face being made in contact with the camera 1 (camera 2).

Moreover, an attaching member used for attaching the cameras 1 and 2 may be placed on the adjusting mechanism 40.

Housing units 5 and 6, each used for housing a string-shaped member (not shown), are respectively attached to the cameras 1 and 2. In the Figures explained below, the illustration of the adjusting mechanism 40 is omitted for convenience of explanation of the image pickup apparatus 50.

Figure 3:
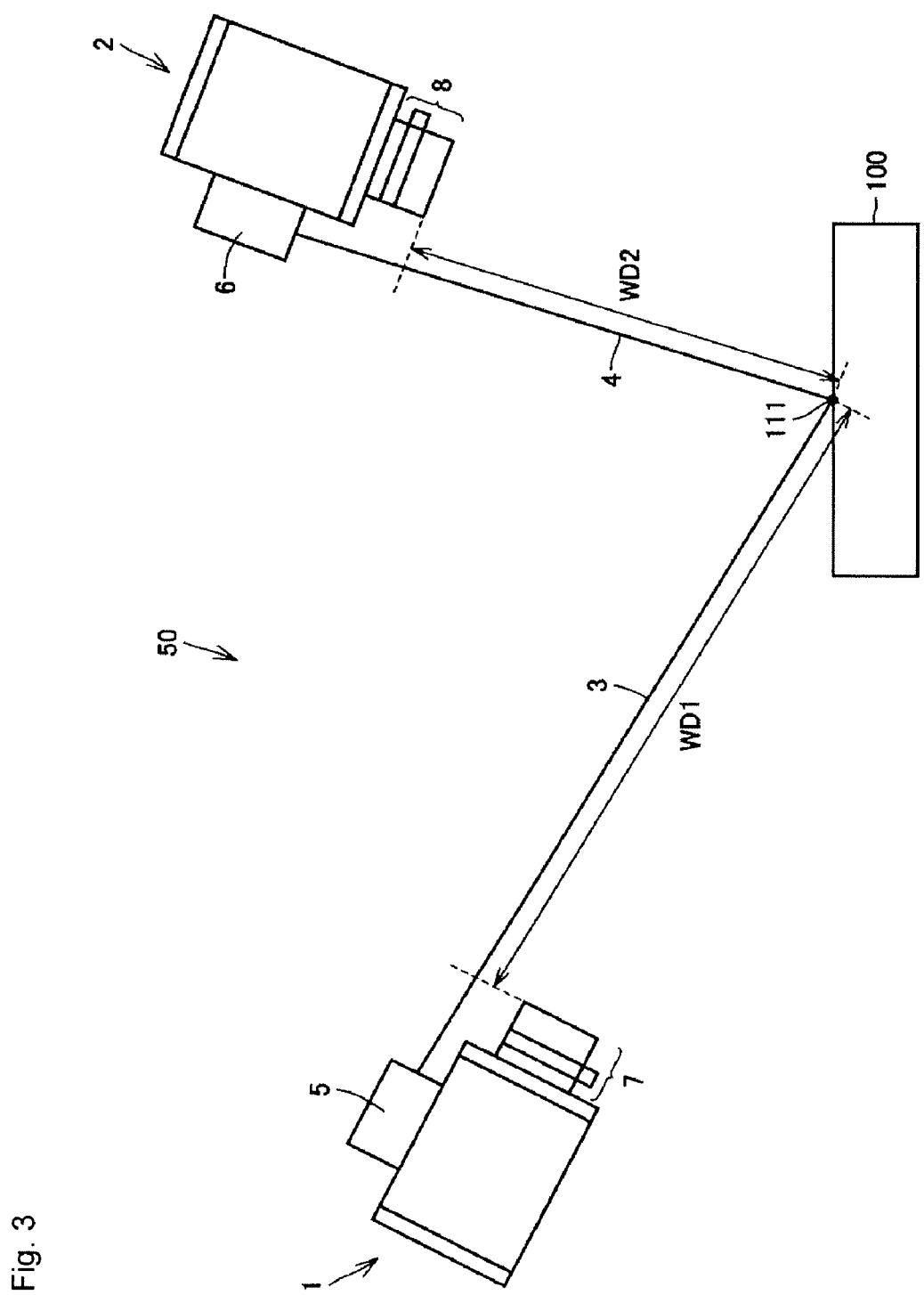
FIG. 3 shows a drawing that explains the structure of the image pickup apparatus 50 and a method for adjusting the cameras 1 and 2 included in the image pickup apparatus 50.

FIG. 3 shows a drawing that explains the structure of the image pickup apparatus 50 and the adjusting method for the cameras 1 and 2 included in the image pickup apparatus 50. As shown in FIG. 3, the image pickup apparatus 50 is provided with the cameras 1 and 2, the string-shaped members 3 and 4, the housing unit 5 for housing the string-shaped member 3 and the housing unit 6 for housing the string-shaped member 4. The housing unit 5 is attached to a box member of the camera 1. The housing unit 6 is attached to a box member of the camera 2.

Each of the string-shaped members 3 and 4 can be freely bent, and is also formed into a straight shape, when a certain degree of tension is given thereto. A spiral spring (not shown) is attached to the inside of the housing unit 5. When one end of the string-shaped member 3 is pulled out of the housing unit 5, a force to pull back the spring-shaped member 3 into the housing unit 5 (winding force exerted on the string-shaped member 3) is exerted by the force of the spiral spring coupled to a second end of the string-shaped member 3. The string-shaped member 3 can be linearly extended tightly by the balance between the winding-up force exerted on the string-shaped member 3 and the force for pulling out the second end of the string-shaped member 3 from the housing unit 5. In short, the spiral spring gives a tension to the string-shaped member 3, with a first end of the string-shaped member 3 being secured. Here, since the string member 4 and the housing unit 6 have the same structures as the string-shaped member 3 and the housing unit 5, the same explanation will not be repeated in the following description.

In the following description, second end (an end on the side opposite to a second end coupled to the spiral spring) of each of the string-members 3 and 4 is referred to also as "a leading edge".

The leading edge of the string-shaped member 3 and the leading edge of the string-shaped member 4 are coupled to each other at a predetermined image pickup position 111 on the surface of the work 100. Here, as explained earlier, there is a high possibility that, upon installing the cameras 1 and 2, no works 100 are present. Therefore, on the assumption that there are a work 100 and an image pickup position 111, the leading edge of the string-shaped member 3 and the leading edge of the string-shaped member 4 may be coupled to each other at the image pickup position 111 (actually, a certain position in a space). In a state where the cameras 1 and 2 are temporarily attached to the adjusting mechanism 40 (see FIG. 2), there is a high possibility that the optical axis directions of the cameras 1 and 2 are not coincident with each other. In such a state, the string-shaped members 3 and 4 may be used as auxiliary members for indicating the position (the position in a space) at which an image pickup subject should be placed.

The means used for coupling the leading edge of the string-member 3 and the leasing end of the string-member 4 is not particularly limited. For example, these may be coupled to each other by using an adhesive tape. By attaching hooks (hook-shaped members) to the tips of the string-shaped members 3 and 4, and by applying the hook to each other, the leading edges of the string-shaped members may be coupled to each other by allowing the hooks to engage with each other.

The cameras 1 and 2 are respectively provided with lenses 7 and 8. The distance (working distance) from the front face position of the lens 7 to the image pickup position 111 is defined as WD1, and the distance (working distance) from the front face position of the lens 8 to the image pickup position 111 is defined as WD2.

Figure 4:
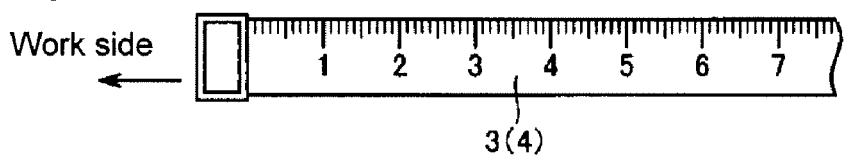
FIG. 4 shows a drawing that explains string-shaped members 3 and 4 in detail.

FIG. 4 shows a drawing that explains the string-shaped members 3 and 4 in detail. As shown in FIG. 4, each of the string-shaped member 3 (and the string-shaped member 4) is specifically prepared a tape measure (measure), with scales used for measuring the length based on a predetermined unit being put on its surface. By referring to the scales put on the tape measure, it is possible to find the working distance.

Figure 5:
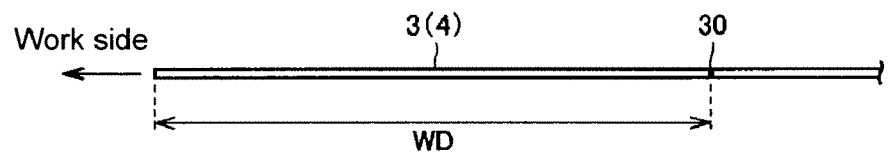
FIG. 5 shows another structural example of the string-shaped members 3 and 4.

FIG. 5 shows another structural example of the string-shaped members 3 and 4. As shown in FIG. 5, a mark 30 is given onto the string-shaped member 3 (and the string-shaped member 4) by the user. The length from the leading edge of the string-shaped member 3 to the mark 30 corresponds to, for example, a predetermined working distance WD. With the leading edge of the string-shaped member 3 being coupled to the work 100 (or a target), the user adjusts the position of the camera 1 so that the position of the mark 30 is coincident with the position of the leading edge of the lens 7. The same processes are carried out also on the adjustments of the camera 2.

As shown in the aforementioned FIG. 3, the user is allowed to find the working distances WD1 and WD2 respectively based upon the lengths of the string-members 3 and 4. That is, the working distance WD1 is indicated by the length of the string-shaped member 3, while the working distance WD2 is indicated by the length of the string-shaped member 4.

In this manner, each of the string-shaped members 3 and 4, with its one end being secured to each of the cameras 1 and 2, is capable of indicating information relating to the distance to a subject (work 100 in FIG. 3) whose converged image is acquired by the corresponding camera (the camera 1 or 2) by the length of the string-shaped member 3 or 4. In the present embodiment, "the distance to the subject whose converged image is acquired by the camera 1 or 2" corresponds to the working distance. Here, this distance includes a distance between the camera and the image-pickup subject (work 100), which is determined within such a distance range as to allow a focused image to be picked up with such a degree that the image-processing apparatus 20 can carry out an image processing thereon, and also includes a distance between the camera and the image-pickup subject (work 100), which provides the best focused image. Moreover, the expression "information relating to the distance is indicated by the length of the string-shaped member 3 or 4" includes a state in which, in an attempt to make the length of the string-shaped member coincident with the distance to the image-pickup subject whose converged image is acquired by the camera (for example, when the tape measure is pulled out from the housing unit), a mark is put at the position of the string-shaped member that is coincident with the corresponding distance (see FIG. 5).

Moreover, by adjusting the optical axis direction of the camera 1 so as to allow the leading edge of the string-shaped member 3 to be included in the viewing field of the camera 1, as well as by adjusting the optical axis direction of the camera 2 so as to allow the leading edge of the spring-shaped member 4 to be included in the viewing field of the camera 2, the viewing field of the camera 1 and the viewing field of the camera 2 can be superposed on each other. Since the optical axis direction of each of the cameras 1 and 2 can be adjusted by the method as explained before (see FIG. 2), the detailed explanation thereof will not be repeated.

In accordance with the present embodiment, the leading edges of the string-shaped members 3 and 4 are mutually coupled so that the leading edges of the respective string-shaped members 3 and 4 are made coincident with each other at the distance to the subject whose converged image is captured by the camera 1 as well as the distance to the subject whose converged image is captured by the camera 2. With this arrangement, even in the case when no image-pickup subject is present, by assuming the position of an image-pickup portion of the object, the working distance from the assumed position can be found from the string-shaped member. Thus, an installation position of the camera can be determined based upon the working distance.

Moreover, in accordance with the present embodiment, since the string-shaped members 3 and 4 are coupled with each other at the image-pickup position, based upon the extending direction of each of the string-shaped members 3 and 4, the optical axis of each of the cameras 1 and 2 can be determined. With this arrangement, even when the working distance is long, with the viewing field of the camera being small, the adjustments of the optical axis directions of the cameras so as to allow the viewing fields of the cameras to be superposed on each other can be easily carried out.

Figure 6:
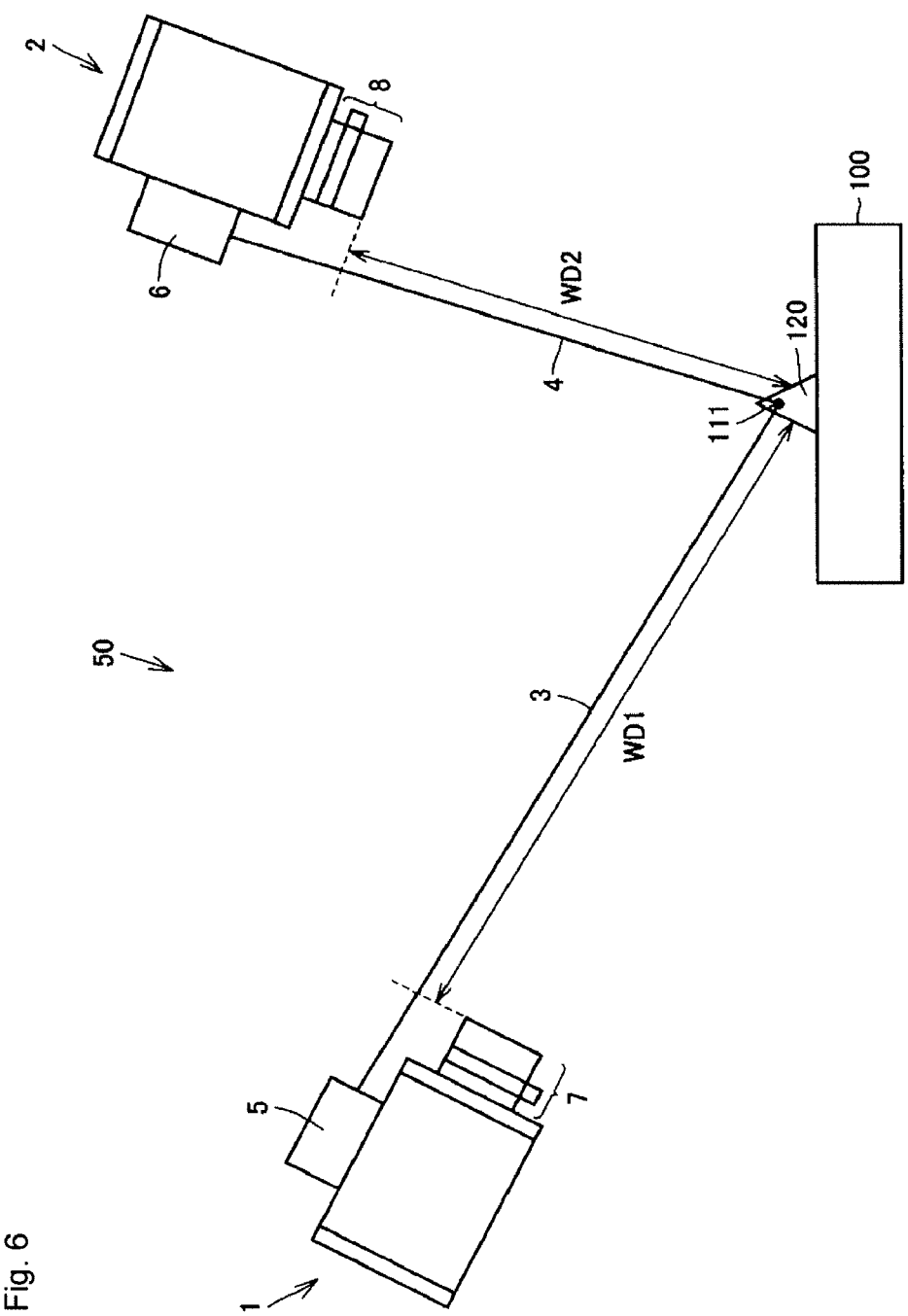
FIG. 6 shows a drawing that explains a first modified example of the adjusting method of the image pickup apparatus 50.

(Modified Example of Method for Adjusting Image-Pickup Apparatus 50) FIG. 6 shows a drawing that explains a first modified example of a method for adjusting the image-pickup apparatus 50. As shown in FIG. 6, in this embodiment, a work 100 is placed, and a target 120 is placed on the surface of the work 100. A certain portion on the surface of the target 120 corresponds to an image-pickup position 111.

In this modified example, it is only necessary to place the target 120 so that a certain portion on the surface of the target 120 corresponds to the image-pickup position 111. Therefore, although it is preferable to use the work 100, the target 120 may be placed, for example, on a base. In this case, the work 100, shown in FIG. 6, corresponds to the base.

In the same manner as in FIG. 3, the leading edge of the string-shaped member 3 and the leading edge of the string-shaped member 4 are coupled to each other. The leading edge of the string-shaped member 3 and the leading edge of the string-shaped member 4 are superposed on the image-pickup position 111 in their coupled state. As described earlier, various means may be used as the means used for coupling the leading edge of the string-shaped member 3 and the leading edge of the string-shaped member 4 to the surface of the target 120.

Even in the case when this method is used, the user can determine the installation position of a camera based upon the position (image-pickup position 111) of the portion of an image-pickup subject and the working distance (lengths of the string-shaped members 3 and 4). Moreover, since the string-shaped members 3 and 4 are coupled to each other at the image-pickup position 111, the direction of the optical axis of each of the cameras 1 and 2 can be determined based upon the extending direction of the string-shaped member 3 or 4. Therefore, even when the working distance is long, with the camera viewing field being small, the adjustment of the optical axis direction of each of the cameras, which is executed so as to superpose the viewing fields of the cameras on each other, can be carried out easily.

Figure 7:
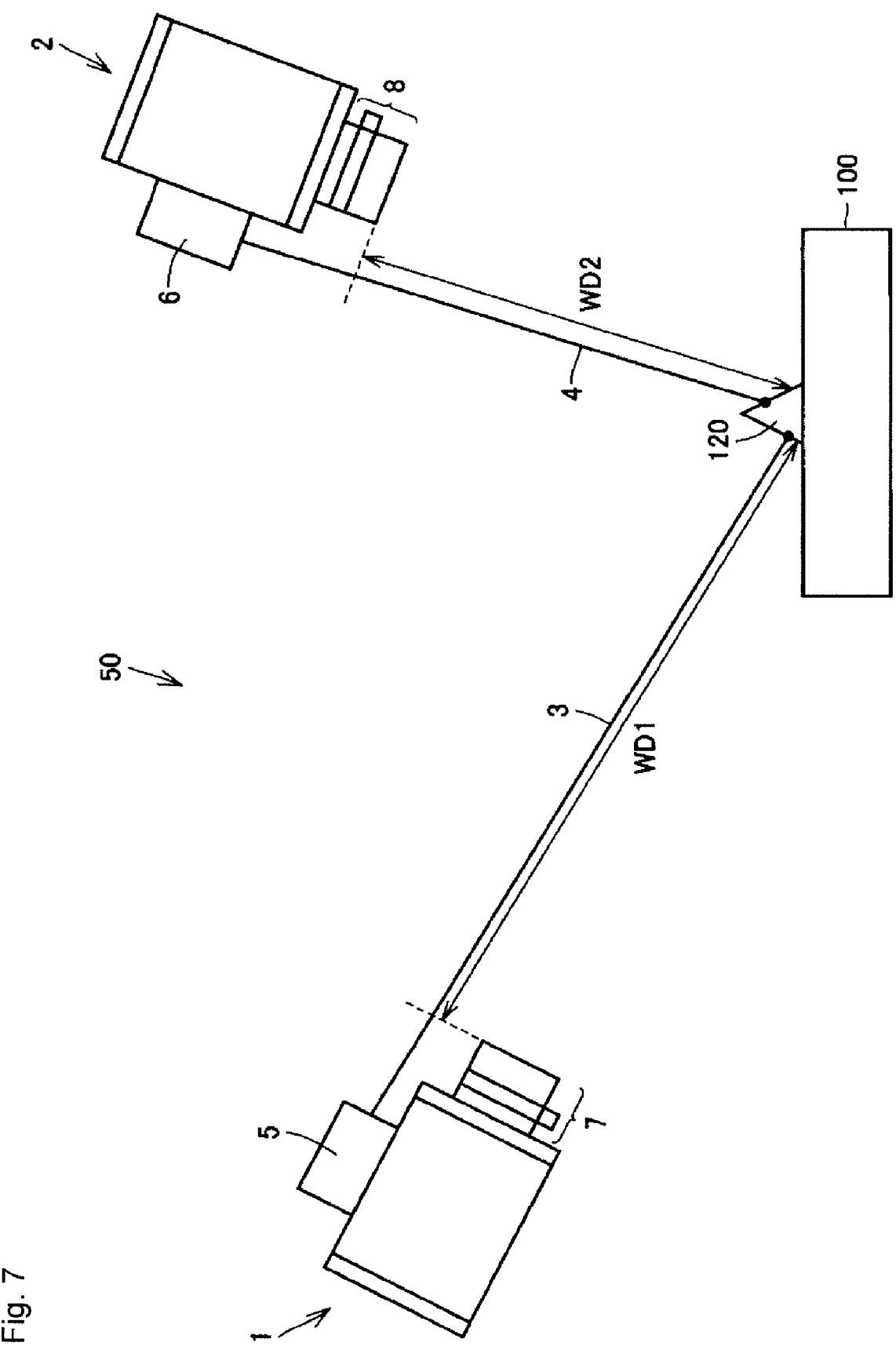
FIG. 7 shows a drawing that explains a second modified example of the adjusting method of the image pickup apparatus 50.

FIG. 7 shows a drawing that explains a second modified example of the adjusting method of the image pickup apparatus 50. As shown in FIG. 7 and FIG. 6, the leading edge of the string-shaped member 3 and the leading edge of the string-shaped member 4 are respectively secured to the surface of the target 120 independently. The optical axis direction of the camera 1 is adjusted so that the leading edge of the string-shaped member 3 is included in the viewing field of the camera 1. In the same manner, the optical axis direction of the camera 2 is adjusted so that the leading edge of the string-shaped member 4 is included in the viewing field of the camera 2. Since the other points are the same as those of the adjusting method shown in FIG. 6, the detailed explanation thereof will not be repeated.

(Processing Flow)

Figure 8:
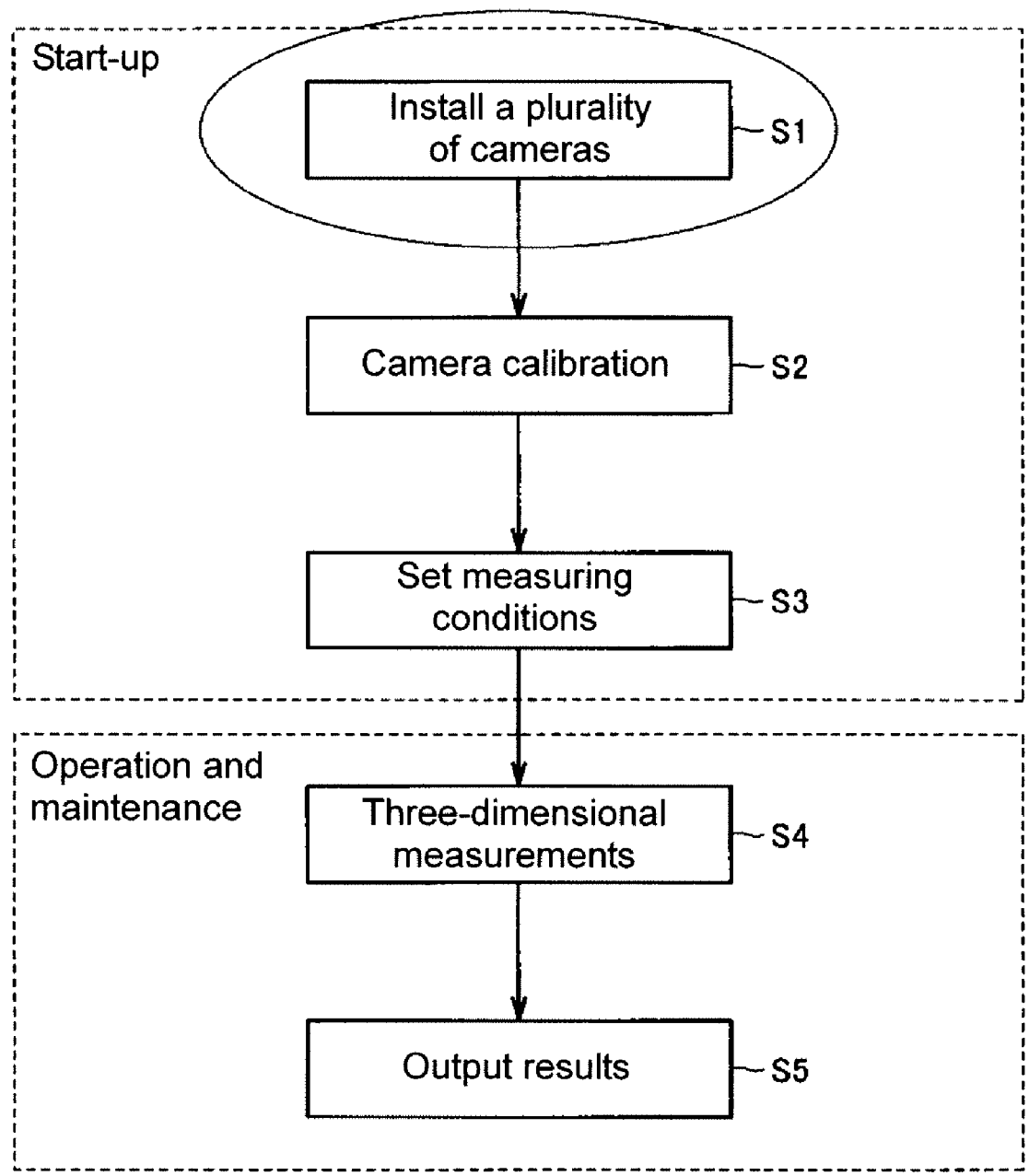
FIG. 8 shows a drawing that explains a processing flow chart of the image inspection system shown in FIG. 1.

FIG. 8 shows a drawing that explains a processing flow of an image inspection system shown in FIG. 1. As shown in FIG. 8 and FIG. 1, the processing of the image inspection system is mainly divided into a start-up processing (processes in steps S1 to S2) and an operation processing (and maintaining processing) (processes in steps S4 and S5).

Upon starting up the image inspection system, first, a plurality cameras (cameras 1 and 2) are installed (step S1). The cameras 1 and 2 are adjusted so that images of the same face of the work 100 can be captured from different image-pickup angles. In step S1, the cameras are adjusted by using the adjusting method of the present embodiment. The flow of these adjustments will be described later in detail.

Next, calibrations of the cameras 1 and 2 are carried out (step S2). A method, for example, disclosed in JP-A No. 2006-250889, may be used as the method for calibrations.

Next, measuring conditions, such as measuring positions on the work, are set (step S3).

Then, three-dimensional measurements are executed (step S4). The image-processing apparatus 20 outputs the results of the three-dimensional measurements to a monitor 15 or another processing apparatus (step S5).

In the processing of step S1, different processes are required upon installing the cameras, depending on whether the work distance is short or long.

Referring to FIG. 6, the following description will discuss a process in which cameras are installed when the work distance is short and a process in which cameras are installed when the work distance is long (that is, adjustments of the image pickup apparatus of embodiment 1). Here, in the case when the work distance is short, it is supposed that no string-shaped members 3 and 4 are present in the image pickup apparatus 50 shown in FIG. 6.

Figure 9:
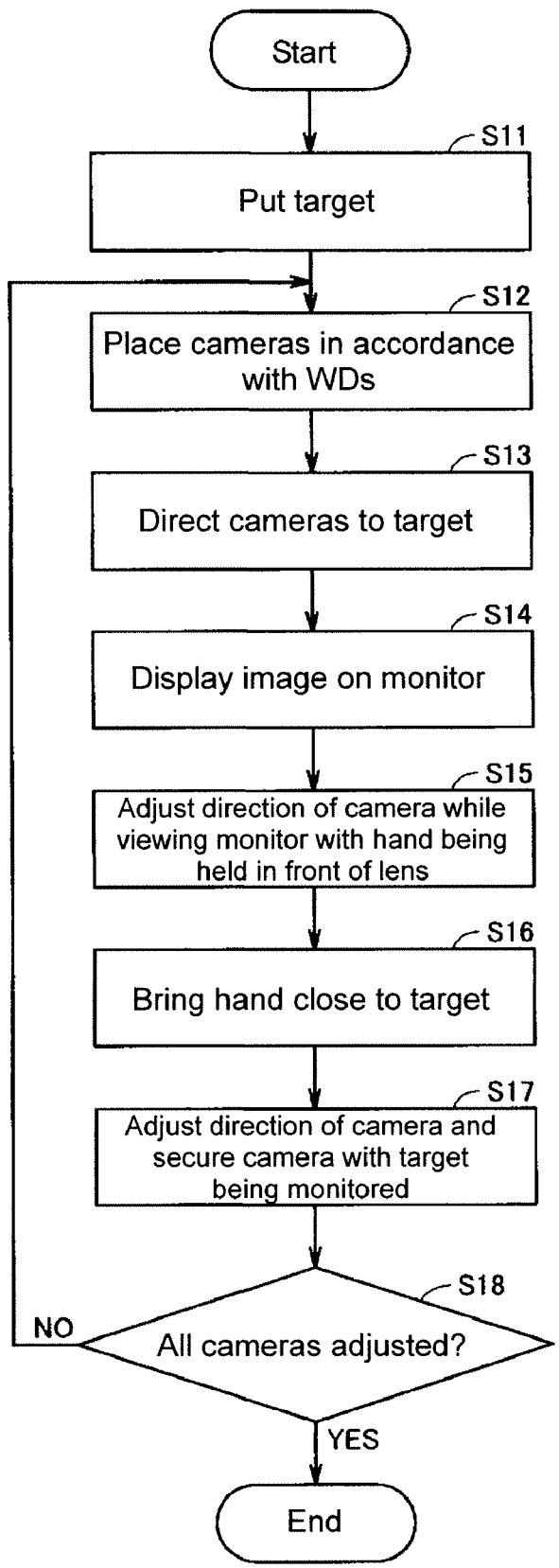
FIG. 9 shows a flow chart that explains installing processes of a plurality of cameras in the case when a work distance is short.

FIG. 9 shows a flow chart that explains an installing process of a plurality of cameras when the work distance is short. As shown in FIG. 9 and FIG. 6, first, a target 120 is placed (step S11). Next, a camera 1 is installed in accordance with a working distance from the target 120 (indicated as "WD" in FIG. 9)(step S12). The length of the working distance is set to, for example, such a length as to allow the user to touch the lens 7 of the camera 1 and the target 120 by the hand when the user moves his or her hand.

Next, the camera 1 is directed to the target 120 (step S13). Since the working distance is comparatively short relative to the viewing field of the camera 1, the image of the target 120 can be captured by directing the camera 1 (lens 7) to the target 120. Thus, the monitor is allowed to display the image of the target 120 captured by the camera 1 (step S14).

Next, the user holds his or her hand on the front side of the lens 7, and adjusts the direction of the camera 1, while viewing the monitor 15 (step S15). Moreover, the user adjusts the direction of the camera, while bringing his or her hand close to the target 120 (step S16).

When the user's hand has reached the position of the target 120, the user confirms the fact that the camera 1 is capturing an image of the target 120 through the monitor 15. Moreover, the user finally adjusts the position of the camera 1, while viewing the monitor 15, with the camera 1 capturing an image of the target 120, so that the camera 1 is secured (step S17).

Next, it is determined whether or not adjustments have been made on all the cameras (step 18). In the case when all the cameras have been adjusted (YES in step 18), the entire processes are completed. In the case when any unadjusted cameras still remain (NO in step S18), the sequence of processes returns to step S12. In this case, the processes of steps S12 to S17 are again executed so that the camera 2 is adjusted.

In the case when the camera viewing field is small with a long working distance, the processes of the flow chart of FIG. 9 are considered to cause the following problems.

First, there is a possibility that the camera 1 is not capturing an image of the target 120 in step S13. Moreover, due to the long working distance (for example, 2 m), it might be difficult for the user to bring his or her hand close to the target, while adjusting the direction of the camera, with his or her hand being held in front of the lens. Furthermore, there is a high possibility that the monitor 15 is installed in a position apart from the user. Therefore, it becomes difficult for the user to adjust the direction of the camera, while monitoring the image displayed on the monitor 15. Consequently, it becomes difficult to execute the processes of steps S13 to S16.

Figure 10:
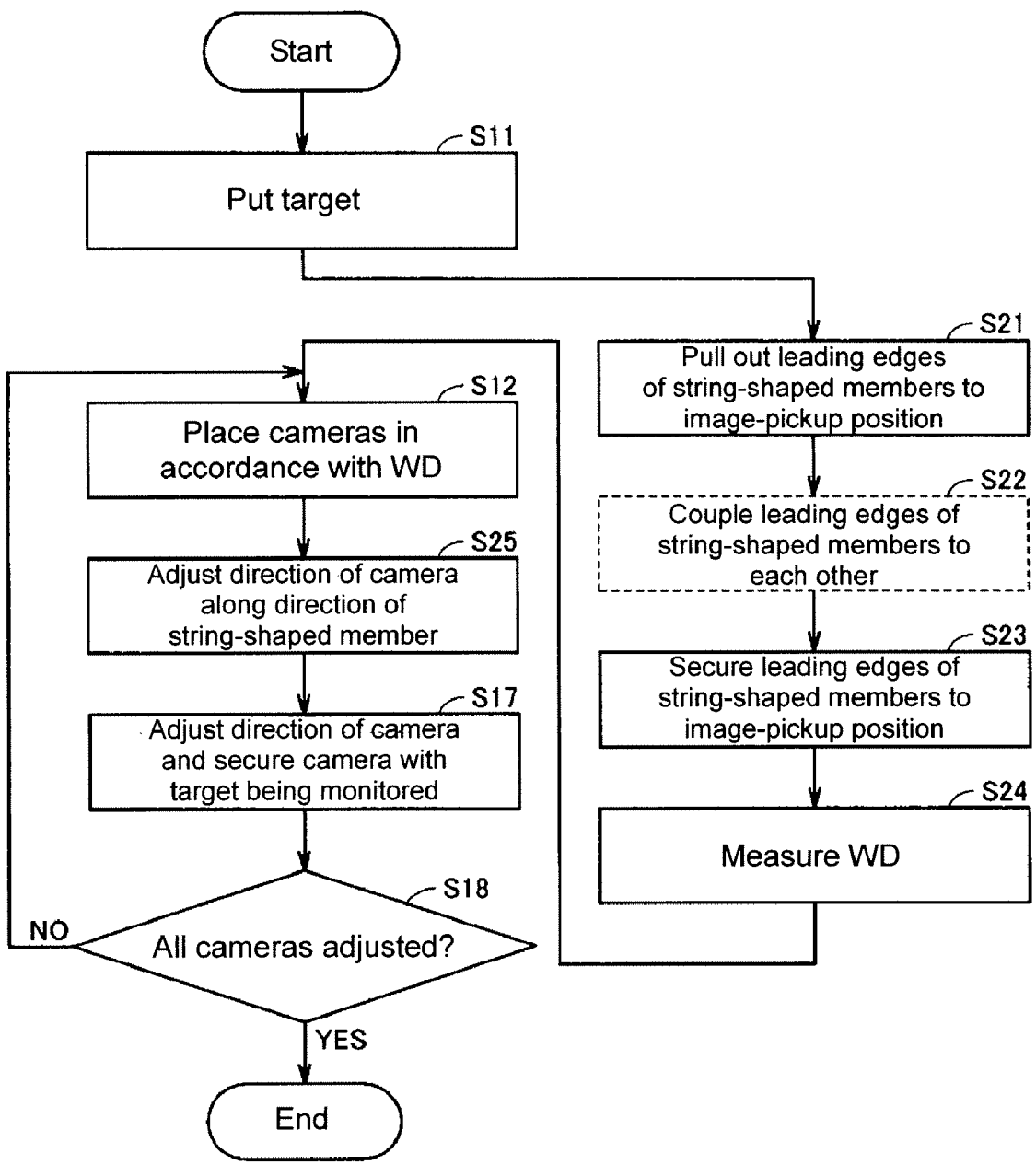
FIG. 10 shows a flow chart that explains adjustments of the image pickup apparatus in accordance with embodiment 1.

FIG. 10 shows a flow chart that explains adjustments of the image pickup apparatus in accordance with embodiment 1. As shown in FIG. 10 and FIG. 9, the processes of the flow chart of FIG. 10 differ from those processes shown in the flow chart of FIG. 9 in that processes of steps S21 to S24 are added between step S11 and step S12, and in that the process of step S25 is executed instead of the processes of steps S13 to S16. The processes of the other steps of the processes of the flow chart of FIG. 10 are the same as those processes in the corresponding steps of the flow chart of FIG. 9. Therefore, the following description will mainly explain the processes of steps S21 to S25.

In step S21, the leading edges of the string-shaped members 3 and 4 are pulled out to the image-pickup position 111. In the case of the adjusting method shown in FIG. 6, after the process in step S21, the leading edges of the string-shaped members 3 and 4 are successively coupled to each other (step S22). In the case of the adjusting method shown in FIG. 6, after the process in step S21, the leading edges of the string-shaped members 3 and 4 are successively coupled to each other (step S22). Next, the leading edges of the string-shaped members 3 and 4 thus coupled to each other are secured to the image-pickup position 111 (step S23).

In the case of the adjusting method shown in FIG. 7, without executing the process of step S22, the respective leading edges of the string-shaped members 3 and 4 are secured to the image-pickup position 111 (step S23).

Following the process of step S23, the working distance is measured by using the string-shaped members 3 and 4 (step S24). Upon completion of the process of step S24, a camera 1 is installed in accordance with the measured working distance (step S12).

Next, in step S25, the orientation (optical axis direction) of the camera 1 is adjusted along the direction of the string-shaped member 3. Thus, the camera optical axis direction is adjusted so that the image-pickup position 111 is included within the viewing field of the camera 1. Next, the process of step S17 is executed. In step S17, the user finally adjusts the position of the camera 1, while viewing the monitor 15 on demand, and secures the camera 1 (step S17).

Here, as also shown in FIG. 3, the process of step S11 is not essential in the flow chart of FIG. 10. That is, the target 120 is not necessarily required to be installed. In this case, by starting the processes from step S21, the respective positions and optical axis directions of a plurality of cameras can be adjusted.

In this manner, in accordance with embodiment 1, by using the string-shaped members, even when the working distance of each of the cameras is long, the positions and optical axis directions of the respective cameras can be easily adjusted.

[Embodiment 2]

Figure 11:
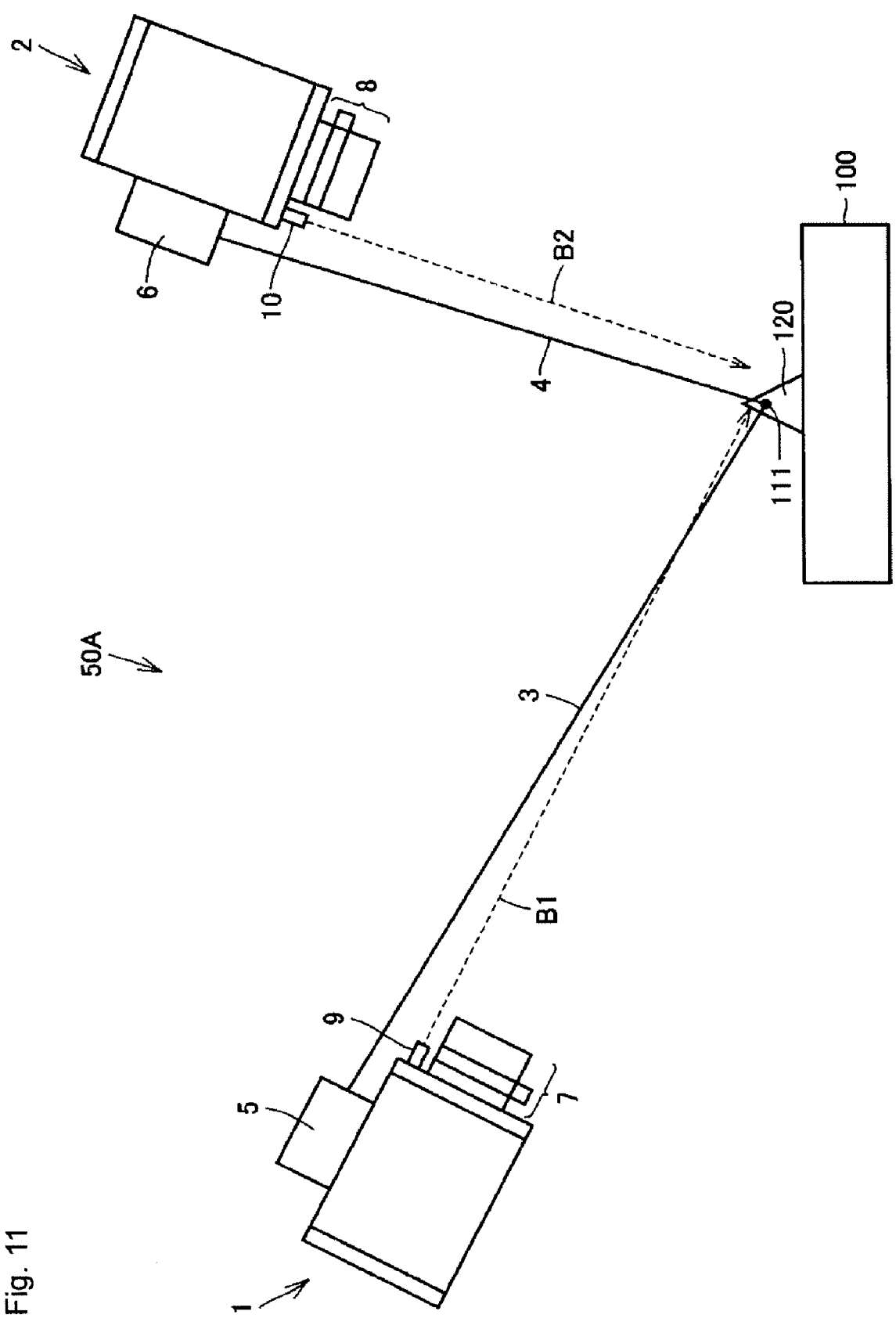
FIG. 11 shows a drawing that explains an image pickup apparatus 50A in accordance with embodiment 2 and a method for adjusting the cameras 1 and 2 included in the image pickup apparatus 50A.

FIG. 11 shows a drawing that explains an adjusting method for an image pickup apparatus 50A and cameras 1 and 2 included in the image pickup apparatus 50A in accordance with embodiment 2.

As shown in FIG. 11 and FIG. 3, the image pickup apparatus 50A differs from the image pickup apparatus 50 in that it further includes a light-emitting device 9 attached to the camera 1 and a light-emitting device 10 attached to the camera 2. Since the structures of the other portions of the image pickup apparatus 50A are the same as those of the image pickup apparatus 50, the explanation thereof is not repeated in the following description.

The light-emitting devices 9 and 10 respectively emit light beams B1 and B2. The direction of the light beam B1 is set to a direction along the optical axis direction of the camera 1 (optical axis direction of lens 7). The direction of the light beam B2 is set to a direction along the optical axis direction of the camera 2 (optical axis direction of lens 8). For example, light-emitting devices including semiconductor lasers (for example, laser pointers) may be used as the light-emitting devices 9 and 10.

Here, with respect to the attaching position of the light-emitting device 9, it is more preferable to make the distance between the optical axis of the light beam B1 emitted from the light-emitting device 9 and the optical axis of the camera 1 (optical axis of the lens) shorter. In the same manner, with respect to the attaching position of the light-emitting device 10, it is more preferable to make the distance between the optical axis of the light beam B2 and the optical axis of the camera 1 (optical axis of the lens) shorter.

In the case when the surface of the target 120 is located in the direction of the light beam B1, a light spot is formed on the surface of the target 120. In the case when the surface of the target 120 is located in the direction of the light beam B2 also, a light spot is formed on the surface of the target 120 in the same manner.

In the adjusting method of embodiment 2, the light beam B1 is emitted from the light-emitting device 9, with the leading edges of the string-shaped members 3 and 4 being superposed on the image-pickup position 111. Then, the optical axis direction of the camera 1 is adjusted so that a light spot derived from the light beam B1 is formed on the surface of the target 120. Thus, the camera 1 is allowed to capture an image of the target 120.

In the case when the optical axis direction of the camera 1 is adjusted along the extending direction of the string-shaped member 3, the user is allowed to recognize whether the optical axis direction of the camera 1 is appropriate or not by confirming the light spot. Thus, the optical axis direction of the camera can be adjusted easily.

In the same manner, a light beam B2 is emitted from the light emitting device 10, and the optical axis direction of the camera 2 is adjusted so that a light spot derived from the light beam B2 is formed on the surface of the target 20. Thus, the camera 2 is allowed to capture an image of the target 120. Consequently, the viewing fields of the camera 1 and the camera 2 can be superposed on each other.

Figure 12:
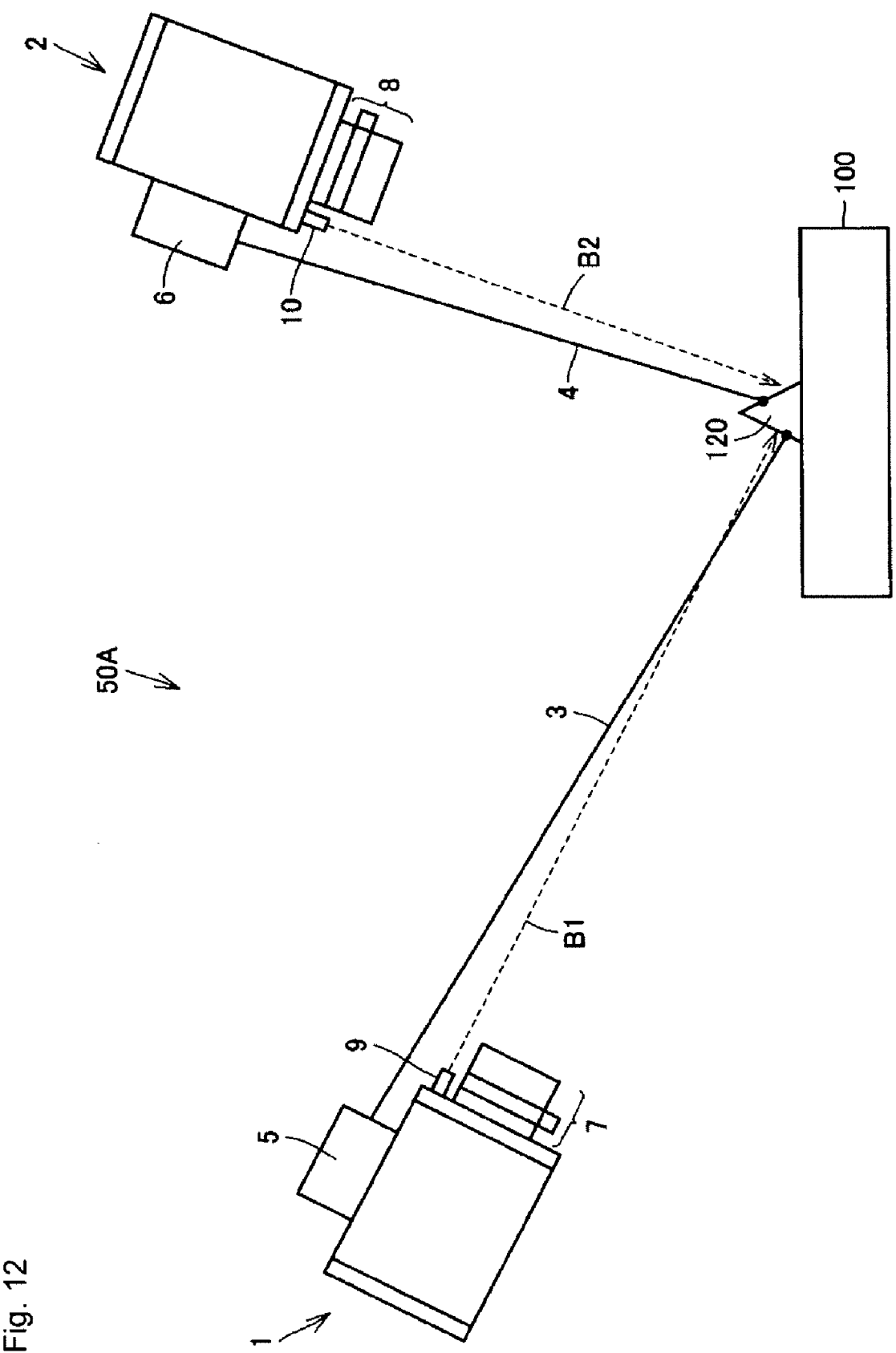
FIG. 12 shows a drawing that explains another method for adjusting the image pickup apparatus 50A.

FIG. 12 shows a drawing that explains another method for adjusting an image pickup apparatus 50A. As shown in FIG. 12 and FIG. 11, the adjusting method shown in FIG. 12 differs from the adjusting method of FIG. 11 in that the tip of the string-shaped member 3 and the tip of the string-shaped member 4 are respectively secured to the surface of the target independently; however, the other points are the same as those of the adjusting method of FIG. 11.

Figure 13:
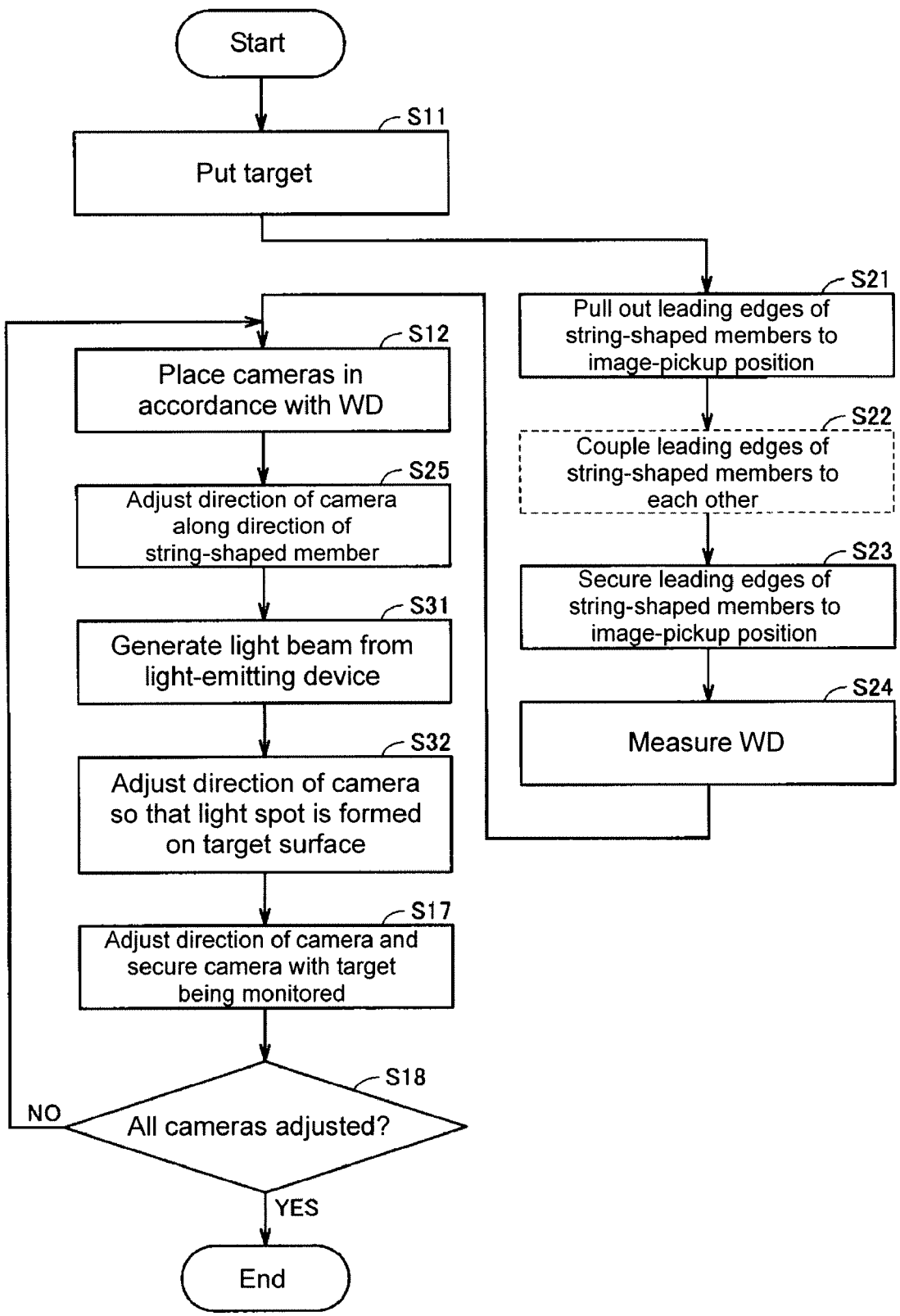
FIG. 13 shows a flow chart that explains adjustments of the image pickup apparatus in accordance with embodiment 2.

FIG. 13 shows a flow chart that explains adjustments of the image pickup apparatus in accordance with embodiment 2. As shown in FIG. 13 and FIG. 10, the flow chart of FIG. 13 differs from the flow chart of FIG. 10 in that processes of steps S31 and S32 are added after the process of step S25. In step S31, a light beam B1 is emitted from the light emitting device 9. Next, in step S32, the orientation of the camera 1 is adjusted so that a light spot is formed on the surface of the target 120. Here, the processes of the other steps in the flow chart of FIG. 13 are the same as those processes of the corresponding steps of FIG. 10; therefore, the same explanation will not be repeated.

As described above, in accordance with embodiment 2, by further installing a light emitting device for emitting a light beam in the optical axis direction of the camera, the adjustment of the camera optical axis direction can be easily carried out in comparison with that of embodiment 1.

While the invention has been shown and described in detail, the foregoing description is in all aspects illustrative and not restrictive. The scope of the present invention is indicated not by the above description of embodiments, but by the following claims, and it is therefore understood that numerous other modifications and variations can be devised without departing from the scope of the invention.

What is claimed is:

1. A three-dimensional measuring instrument comprising:
a plurality of cameras;
an attaching structure configured to attach and secure the plurality of cameras;

an adjusting structure configured to adjust an optical axis direction of each of the cameras;
a plurality of light-emitting devices, installed in the corresponding cameras respectively, each of which is allowed to emit a light beam in the optical axis direction of the corresponding camera;
a plurality of string-shaped members that are installed in the corresponding cameras respectively, with first ends of each string-shaped member being secured to the corresponding camera, so that information relating to a distance to a subject whose converged image is acquired by the corresponding camera is indicated by lengths of the corresponding string-shaped member; and
a processor configured to carry out a three-dimensional measuring process by using images of the common image-pickup subject that are picked up by the cameras from different angles.

2. The three-dimensional measuring instrument according to claim 1, wherein the string-shaped members are tape measures that are attached to the corresponding cameras, and indicate distances from the corresponding cameras.

3. An image pickup apparatus comprising:
a camera configured to pick up an image of a subject;
an adjusting structure configured to adjust an optical axis direction of the camera;
a light-emitting device that emits a light beam in an optical axis direction of the camera;
an attaching structure that is installed in the camera or the adjusting mechanism so that the camera is attached to the attaching structure to be secured thereon; and
a string-shaped member, a first end of which is secured to the camera so that information relating to a distance to a subject whose converged image is acquired by the corresponding camera is indicated by a length of the string-shaped member.

4. A method for adjusting an image pickup apparatus,
the image pickup apparatus comprising:
a plurality of cameras;
a plurality of light-emitting devices, each of which emits a light beam in the optical axis direction of each of the cameras;
a plurality of string-shaped members that are installed in the corresponding cameras respectively, with first ends of a corresponding string-shaped member being secured to the corresponding camera, so that information relating to a distance from the corresponding camera is indicated by lengths of the string-shaped members;
the method comprising the steps of:
with respect to the respective string-shaped members, coupling second ends to each other so that the second ends of the respective string-shaped members are coincident with each other at a distance from which the corresponding camera is indicated by the length of the string-shaped members;
applying tensions to the respective string-shaped members so that the respective string-shaped members are linearly extended;
placing an image-pickup subject at the position of the second ends that are coupled to each other, with the tensions being applied to the respective string-shaped members;
adjusting the optical axis direction of each of the cameras so as to pick up an image of the image-pickup subject placed at the position of the second ends that are coupled to each other;
allowing each of the light-emitting devices to generate the light beam; and
adjusting the optical axis direction so that the light beam is allowed to reach the image-pickup subject.

5. A method for adjusting an image pickup apparatus:
the image pickup apparatus comprising:
a plurality of cameras;
a plurality of light-emitting devices, each of which emits a light beam in the optical axis direction of each of the cameras; and
a plurality of string-shaped members that are installed in the corresponding cameras respectively, with first ends of a corresponding string-shaped member being secured to the corresponding camera, so that information relating to a distance to a subject whose converged image is acquired by the corresponding camera is indicated by lengths of the string-shaped members;
the method comprising the steps of
placing an image-pickup subject at a predetermined position;
securing second ends of the respective string-shaped members to the image-pickup subject;
applying tensions to the respective string-shaped members so that the respective string-shaped members are linearly extended;
determining positions of the respective lenses of the cameras relative to the predetermined position, based upon the lengths of the string-shaped members corresponding to the cameras;
adjusting the optical axis direction of each of the plurality of cameras based upon the extending direction of the corresponding string-shaped member;
allowing each of the light-emitting devices to generate the light beam; and
adjusting the optical axis direction so that the light beam is allowed to reach the image-pickup subject.

* * * * *